(12) United States Patent
Valentine et al.

(10) Patent No.: US 12,461,880 B2
(45) Date of Patent: Nov. 4, 2025

(54) TEST DATA TRANSFER IN MULTI-DIE SYSTEMS

(71) Applicant: NVIDIA Corporation, Santa Clara, CA (US)

(72) Inventors: Nithin Anil Valentine, Santa Clara, CA (US); Shantanu Sarangi, Santa Clara, CA (US); Mahmut Yilmaz, Santa Clara, CA (US); Ish Chadha, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 6 days.

(21) Appl. No.: 18/785,170

(22) Filed: Jul. 26, 2024

(65) Prior Publication Data

US 2025/0264528 A1 Aug. 21, 2025

Related U.S. Application Data

(60) Provisional application No. 63/555,363, filed on Feb. 19, 2024.

(51) Int. Cl.
*G06F 13/42* (2006.01)
*G01R 31/3181* (2006.01)

(52) U.S. Cl.
CPC ... *G06F 13/4221* (2013.01); *G01R 31/31813* (2013.01); *G06F 2213/0026* (2013.01)

(58) Field of Classification Search
CPC ......... G06F 13/4221; G06F 2213/0026; G01R 31/31813

See application file for complete search history.

(56) References Cited

U.S. PATENT DOCUMENTS

| | | |
|---|---|---|
| 10,663,515 B2 | 5/2020 | Narayanun et al. |
| 11,408,934 B2 | 8/2022 | Sarangi et al. |
| 11,726,139 B2 | 8/2023 | Sarangi et al. |
| 12,078,678 B2 | 9/2024 | Sarangi et al. |
| 2018/0096979 A1* | 4/2018 | Pappu .................. G11C 5/025 |
| 2022/0180959 A1* | 6/2022 | Borgonovo ...... G11C 29/12015 |

(Continued)

OTHER PUBLICATIONS

B. Blaner, D. Czenkusch, R. Devins and S. Stever, "An embedded PowerPC/sup TM/SOC for test and measurement applications," Proceedings of 13th Annual IEEE International ASIC/SOC Conference (Cat. No.00TH8541), Arlington, VA, USA, 2000, pp. 204-208 , (Year: 2000).*

(Continued)

*Primary Examiner* — Cynthia Britt

(57) ABSTRACT

An integrated circuit package includes two or more discrete semiconductor dies coupled to a package substrate. The dies include a primary die and at least one secondary die. The primary die includes an external data transfer interface, a direct memory access ("DMA") controller, a primary cross-die bridge, and at least one primary die-to-die interface. At least one of the secondary dies includes a secondary test controller, a secondary cross-die bridge, and a secondary die-to-die interface. A secondary die is operable to send a test data read request to a host system and to receive a test data read response therefrom. The secondary die is further operable to cause a test to be performed on circuitry within the die responsive to contents in the test data read response.

25 Claims, 6 Drawing Sheets

(56) References Cited

U.S. PATENT DOCUMENTS

2023/0335176 A1* 10/2023 Giduturi ............. G11C 11/4076
2025/0231236 A1*  7/2025 Brahmadathan ..............................
                                                      G01R 31/318513

OTHER PUBLICATIONS

Crouch, "IJTAG vs JTAG vs IEEE 1500 ECT Technical Tutorial," 2nd Ed. (ASSET InterTech, Inc., 2016).
Saggurti, "IEEE Test Standards: Wait, What ?! Can You Explain Them To Me?," as downloaded from https://www.chipestimate.com/IEEE-Test-Standards-Wait-What-Can-you-explain-them-to-me/Synopsys/Technical-Article/2016/02/02 on Feb. 19, 2024.

* cited by examiner

TEST DATA TRANSFER IN MULTI-DIE SYSTEMS

CROSS REFERENCE TO RELATED APPLICATIONS

This application claims benefit to the filing date of U.S. Provisional Patent Application No. 63/555,363, filed on 2024 Feb. 19 (the "Provisional Application"), the contents of which are hereby incorporated by reference as if entirely set forth herein. In the event of conflict between the meaning of a term used in this document and the same or a similar term used in the Provisional Application or in another document incorporated herein by reference, the meaning associated with this document shall control.

BACKGROUND

Multi-Die Systems

In recent years, interest has increased in using multi-die systems to address the challenges associated with adding complexity and performance to a single integrated circuit package.

By way of background, integrated circuits are typically produced in batches on a large wafer of semiconductor material that contains many identical copies of the same integrated circuit. The wafer is then cut (diced) into many pieces, such that each piece contains a single copy of the integrated circuit. Each such piece is known as a "die." In a traditional integrated circuit package, a single die is assembled into the package by coupling electrical nodes on the die to corresponding contacts that are accessible on the outside of the package. The package may then be deployed in a host system by coupling the package contacts to corresponding contacts on a socket or on a printed circuit board ("PCB") of the host system. For traditional integrated circuit packages, only one die is housed within a single discrete package.

In contrast to traditional integrated circuit packages, multi-die systems are characterized by a many to one relationship between dies and the package that contains them. That is, in a multi-die system, two or more discrete dies are housed within a single discrete package. A multi-die system may take any of various different forms. For example, a multi-die system may correspond to a two-dimensional ("2D") package type, a redistribution layer ("RDL") fanout package type, a silicon interposer package type, or a hybrid bonding package type. In any of such forms, each die in the multi-die system is coupled directly or indirectly to a single package substrate that provides the electrical contacts that are accessible on the outside of the package. In the 2D package type, each die is coupled directly to the package substrate. In the RDL fanout and in the silicon interposer package types, which are sometimes referred to as two-and-a-half dimensional ("2.5D") package types, nodes on the dies are coupled to corresponding nodes on an interposer, and nodes on the interposer are coupled directly to the package substrate. In the hybrid bonding package type, which is sometimes referred to as a three-dimensional ("3D") package type, the bottom of a first die is coupled directly to the top of a second die, and the second die is coupled directly to the package substrate. Combinations and variations of these and other package types are also possible in multi-die systems.

Structural Pattern Testing and its Limitations

A number of different types of tests may be applied to an integrated circuit package to verify its correctness. By way of example, one such type of testing is typically applied at the time of manufacture and is performed to verify low-level aspects of the package, such as whether the circuit housed therein has been assembled correctly based on building blocks specified in a corresponding structural netlist. This type of testing is referred to variously as "structural pattern testing," "structural test," or "scan test" because it involves scanning a test pattern (a series of logical 1s and 0s) into the circuit housed in the package. Flip flop elements in a circuit to be tested are designed to implement "scan cells," which are linked together in series to form a scan chain. When the circuit is placed in a test mode, the scan cells in the chain function as a large shift register, which enables a test pattern to be clocked into the cells that form the chain. Once a test pattern has been loaded in this manner, the circuit under test is placed in a functional mode wherein the test pattern provides a stimulus for the logic in the circuit, while a corresponding test response is captured over one or more clock cycles of operation. After this has been accomplished, the circuit is once again placed in test mode, and the captured test response is then shifted out of the scan cells for analysis by another system, such as by an automated test equipment ("ATE") platform to which the integrated circuit package is coupled.

Standards have been developed to foster uniformity in the equipment that is used to perform scan testing and to increase the efficiency of the designers who are tasked with supporting scan testing. Among these are a suite of Joint Test Action Group ("JTAG") standards, including an IEEE 1687 Internal JTAG standard, an IEEE 1149.1 Boundary Scan standard, and an IEEE 1500 Embedded Core Test standard, among others.

Despite the efficiencies gained by the JTAG standards, performing structural pattern tests and similar tests in accordance with the JTAG standards has become slow and expensive for modern integrated circuit packages. This is because testing according to the JTAG standards requires using selected input/output ("I/O") pins on a package to clock test patterns into the package serially. Over time, the size of the integrated circuits housed in such packages has grown, but the number of I/O pins on the packages has not increased proportionally, nor has the speed of the I/O pins increased dramatically. Moreover, the costs of ATE platforms have increased over time because such costs are proportional to the number of I/O channels an ATE platform provides and to the speed and memory requirements for each channel.

These problems are particularly acute in the case of multi-die systems, which typically increase the amount of circuitry and complexity housed in a single discrete chip package without providing a commensurate increase in the number or the speed of the I/O pins that are available on the outside of the package.

A need therefore exists for improved techniques for implementing tests on circuitry in multi-die systems.

DETAILED DESCRIPTION

Nomenclature

Figure 1:
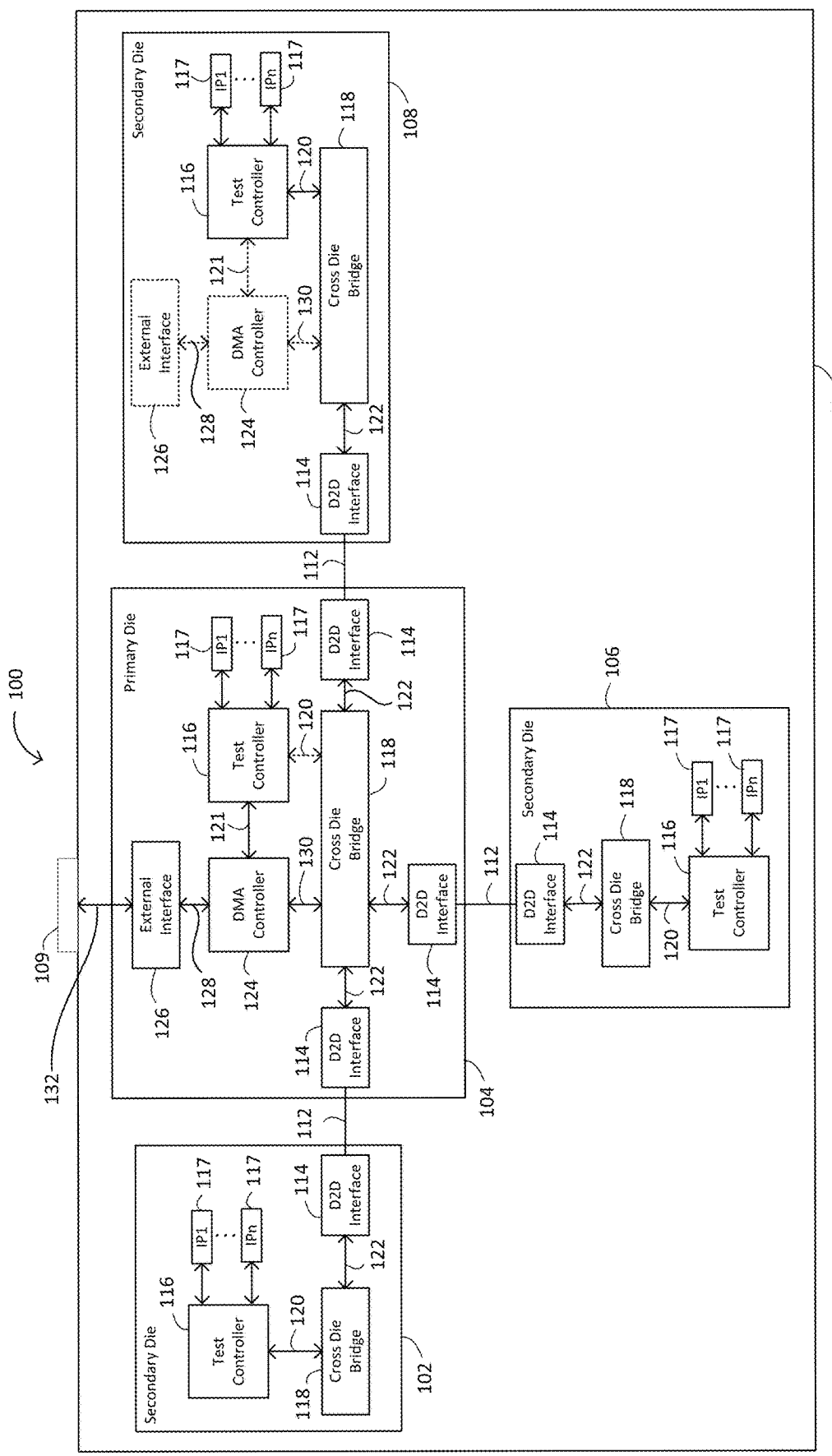
FIG. 1 is a block diagram schematically illustrating an example multi-die system in accordance with embodiments.

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and is therefore not currently performing the function. Use of the phrase "configured to" herein does not necessarily mean that the described item has been modified in some way relative to a previous state. "Coupled" as used herein refers to a connection between items. Such a connection can be direct or can be indirect through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise. For example, articles of speech such as "a," "an," and "the," when used in a claim or a sentence subsequent to words such as "including," "comprising," or their variants, mean "one or more."

Modern Approaches to Structural Pattern Testing

In response to the problems described above in relation to traditional methods of structural pattern testing, alternative techniques have been developed that can be used either in lieu of or in conjunction with the JTAG standards. For example, one group of authors have described a mechanism for transferring packetized test data between a test system and an integrated circuit package under test via a high speed link such as a peripheral component interconnect express ("PCIe") interface. See Yilmaz, et al., NVIDIA MATHS: Mechanism to Access Test-Data over High-Speed Links," IEEE Design & Test, vol. 40, no. 4, pp. 25-33 (IEEE 2023), the contents of which are hereby incorporated by reference as if entirely set forth herein. By way of further example, another group of authors have described a mechanism for transferring test data between two discrete integrated circuit packages via a PCIe link and efficiently utilizing the test data within an integrated circuit package. See Jagannadha, et al., "Special Session: In-System-Test (IST) Architecture for NVIDIA Drive-AGX Platforms," 2019 IEEE 37$^{th}$ VLSI Test Symposium (IEEE 2019), the contents of which are hereby incorporated by reference as if entirely set forth herein. The techniques to be described herein may be used in conjunction with either or both of the mechanisms described by Yilmaz, et al., and Jagannadha, et al., or may be used independently of those mechanisms.

Example Embodiments

While the techniques described by Yilmaz, et al., and Jagannadha, et al., focus on conventional single-die integrated circuit packages, the techniques to be described below move beyond those techniques to provide a scalable, high-bandwidth solution for transferring test data into, and test results out of, multi-die integrated circuit packages.

FIG. 1 is a block diagram schematically illustrating an example multi-die system according to embodiments. The illustrated example system includes four semiconductor dies 102, 104, 106, 108 that are contained within a single discrete integrated circuit package 100. Although the illustrated system includes four dies, multi-die systems according to embodiments may include any number of two or more discrete dies in a single package. Package 100 includes a single package substrate 110 on which all of the four dies are mounted. The dies may be coupled to the package substrate in any suitable fashion including, for example, any of those described above. In any such embodiments, one or more of the dies may be coupled directly to the package substrate or may be coupled to its own die substrate, which in turn may be coupled directly to the package substrate, or indirectly to the package substrate, such as by means of one or more interposers or by hybrid bonding. Other die mounting arrangements may also be used.

The package substrate includes an array of conductive elements, indicated schematically at 109, that are electrically accessible from outside the integrated circuit package. For example, the package substrate may provide a ball grid array ("BGA") or a pin grid array ("PGA") of conductive elements that enable the package to be coupled to corresponding conductive elements on a socket or on a printed circuit board ("PCB") of a host system. Other types of package-external connector arrays may also be used.

Package 100 includes a primary die and one or more secondary dies. In the illustrated example, die 104 is configured as the primary die, and dies 102, 106, and 108 are configured as secondary dies. Each secondary die is coupled to the primary die by a die-to-die ("D2D") link 112 that is operable to transfer data and control signals between two dies. In general, each D2D link may comprise one or more electrical conductors or optical fibers coupled between corresponding D2D interfaces 114 disposed on the respective dies at opposite ends of the D2D link. In various embodiments, the D2D links and the D2D interfaces may be implemented in accordance with any of several known D2D interface standards, such as the Advanced Interconnect Bus ("AIB") standards, the High Bandwidth Interconnect ("HBI") standard, the extra Short Reach ("XSR") or Very Short Reach ("VSR") standards, the Universal Chiplet Interconnect Express ("UCIe") standard, or the UltraLink D2D standard. Other D2D interfaces may also be used.

In addition to a D2D interface, each secondary die also includes a test controller 116 and a cross die bridge 118. The cross die bridge on each secondary die includes one bridge port 120 coupled to the test controller on the die, and another bridge port 122 coupled to the D2D interface on the die. The bridge ports on the die are configured to transmit data in packets according to a protocol that is suited to the client device to which the bridge port is connected. For example, bridge ports 120 may operate in accordance with a test controller protocol, while bridge ports 122 may operate in accordance with a D2D interface protocol. The cross die bridges may be configured to translate between the respective protocols as needed, for example by means of packet encapsulation and un-encapsulation. As a more specific illustrative example, for a test controller data packet traveling to a destination outside of a die on which the test controller is disposed, a cross die bridge and/or a D2D interface on the die may encapsulate the test controller protocol packet inside a D2D interface protocol packet for transmission outside of the die and may do the reverse for data packets that are entering the die.

Each test controller on a die is configured to perform tests on the one or more functional units 117 that are disposed on the die. The test controllers may do so in any suitable manner including, for example, in accordance with the techniques described by Yilmaz, et al., and by Jagannadha, et al.

Like the secondary dies, primary die 104 also includes a cross die bridge 118 and at least one D2D interface 114. In various embodiments, however, the primary die may include multiple D2D interfaces—one D2D interface for each of the secondary dies in the integrated circuit package. In such embodiments, the dies in the package may be interconnected in star pattern, as shown, wherein the primary die may function as a hub to which all other dies are connected. To accomplish this, the cross die bridge on the primary die may be provided with a separate bridge port 122 for each D2D interface, also as shown.

Unlike the secondary dies, primary die 104 additionally includes a direct memory access ("DMA") controller 124 and an external data transfer interface 126. In package 100, only the primary die has direct access to the external data transfer interface. The DMA controller has one DMA controller port 128 coupled to the external data transfer interface and another DMA controller port 130 coupled to the primary die's cross die bridge. DMA controller port 128 may be configured to operate according to an external interface protocol, while DMA port 130 may be configured to operate according to a different protocol, such as the test controller protocol. As will be further explained below, configuring DMA port 130 and DMA port 121 to operate according to the same protocol (e.g., to the test controller protocol) confers a benefit of efficiency for systems in which some of the dies may be configurable to behave either as a primary die or as a secondary die in a given system.

Data and control signals associated with external data transfer interface 126 are coupled, via data transfer bus 132, to corresponding nodes in the array of external conductive elements on package substrate 110 (e.g., to corresponding balls of a BGA package or to corresponding pins of a PGA package). Thus, while D2D links 112 are not directly accessible from outside of the package, the conductive elements associated with the external data transfer interface are directly electrically accessible on the outside of the package. In this manner, the external data transfer interface may provide a high-bandwidth data transfer channel between package 100 and a host system to which the package is connected for testing, or in which the package has been deployed in the field. Although the external data transfer interface may be configured to implement any appropriate protocol, in some embodiments the external data transfer interface may comprise a PCIe interface.

Interconnection with Host System

Figure 2:
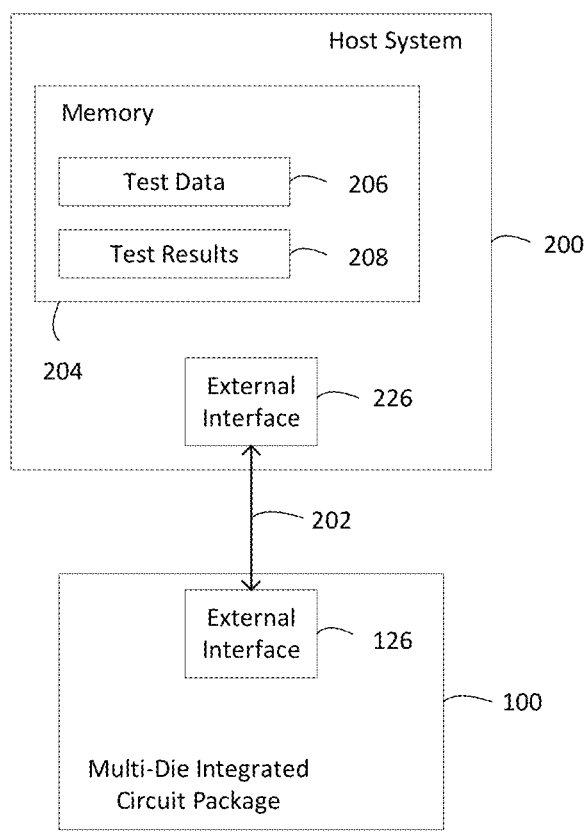
FIG. 2 is a block diagram schematically illustrating an example interconnection between a multi-die system and a host system, in accordance with embodiments.

FIG. 2 is a block diagram schematically illustrating an example interconnection between a multi-die integrated circuit package 100 and a host system 200, in accordance with embodiments. In the drawing, the external data transfer interface 126 of multi-die integrated circuit package 100 is shown coupled by a data transfer bus 202 to a corresponding external data transfer interface 226 in the host system. In some embodiments, external interfaces 126, 226 may comprise PCIe interfaces, and data transfer bus 226 may comprise a PCIe bus. In other embodiments, other data transfer interfaces may be used.

Host system 200 manages a memory device or memory system 204 and makes the memory available to circuitry in package 100 via external interface 226. Address locations are reserved within the memory for storing test data patterns 206 and for storing test data results 208.

In operation, a test controller on one of the dies in package 100 may issue a test data DMA read request to access a test pattern from a location 206 in the memory for use as a stimulus during the testing of one or more of the functional units 117 of the die on which the test controller is disposed. The DMA controller in package 100 may send the DMA read request to the host system via bus 202 and may receive a DMA read response, also via bus 202. The DMA read response is then routed within package 100 to the test controller that initiated the read request. Once the test controller receives the requested test pattern or patterns from the DMA controller, it uses the pattern to test one or more functional units on the respective die. While doing so, the test controller collects corresponding test result data. When the test is completed or when test result data is otherwise ready to be stored, the test controller may issue a test data DMA write request to store the test result data at a location 208 in memory 204. The DMA write request is forwarded to the host system via external data transfer bus 202 and interfaces 126, 226, and is executed by the host system in a manner similar to that of the DMA read request.

Host system 200 may take any of a wide variety of forms. In some embodiments, the host system may comprise one or more ATE platforms. In other embodiments, the host system may comprise a device or system in which package 100 has been deployed in the field such as, for example, an automobile, a cell phone, or a mobile computing platform. In either case, a controller such as a boot processor inside package 100 may initiate testing of the functional units on the dies in the package by initiating test routines in one or more of the test controllers on the dies. By way of example, a boot processor may initiate testing on each power-up of the integrated circuit package. In various embodiments, a host system may initiate test routines at any time by issuing a corresponding command to package 100 via external interface 126, or via one or more external JTAG interfaces on the package, or by other suitable means.

Dies Configurable to Behave as a Primary or a Secondary Die

In some embodiments, the primary die may additionally include a test controller 116. Die 104 in FIG. 1 illustrates an example of such a case. In such embodiments, the test controller on the primary die may be employed to test functional units 117 that are disposed on the primary die in the same manner in which test controllers on secondary dies may be employed to test the functional units 117 that are disposed on their respective dies. To implement such embodiments, DMA controller 124 may be provided with an additional DMA port 121 that is coupled to the test controller on the primary die, and bridge port 120 on the primary die may be disabled, as indicated in the drawing by the dashed line between the test controller and the cross bridge die bridge on the primary die.

In the latter embodiments, the DMA controller may be configured to route incoming data packets destined for the primary die test controller over port 121 and to route other incoming data packets over port 130. In such embodiments, the DMA controller may read a die or test controller identifier or other destination address contained in a destination field of a packet header in each data packet to determine over which of the two DMA ports a given packet should be transmitted.

As was mentioned above, in such embodiments the DMA controller may be configured to use the same protocol (for example, the test controller protocol) for data exchanges on both of ports 121 and 130. When this is the case, the DMA controller may treat the cross die bridge on the primary die as if it were a second test controller, or may treat the test controller on the primary die as if it were a second cross die bridge, in terms of the protocol to be used for a given data transfer. Using the same data transfer protocol on ports 121 and 130 in this manner may simplify the design of the DMA controller.

In these or other embodiments, a secondary die may additionally include a DMA controller 124 and an external data transfer interface 126. Die 108 in FIG. 1 illustrates an example of the latter case. In these embodiments, the DMA controller and the external data transfer interface on the secondary die may be disabled (along with any additional D2D interfaces, if present) as indicated by the dashed lines on die 108. When the DMA controller and the external data transfer interface on die 108 are disabled, the die may function in a manner identical to that of dies 102 and 106.

In any of the above embodiments, a given die may be configured to behave as a primary die or a secondary die by means of control bits associated with each die. Such control bits may be disposed on the respective dies or elsewhere within package 100 and may be set either at the time of manufacture or under software control. In the former case, the bits may be set by any appropriate means, such as by fused links. In the latter case, a host system may set the bits by writing to one or more control registers in the package. Once the control bits have been set appropriately, each of the components on a given die may configure its runtime behavior in accordance with the state of the control bits associated with the respective die.

When a die is configured to behave as a secondary die, the cross die bridge on the die may function as a link between the test controller on the die and the die-to-die interface on the die. On the other hand, when a die is configured to behave as a primary die, the cross die bridge on the die may function as a link between the DMA controller on the die and each of two or more die-to-die interfaces on the die.

In further embodiments, a test controller on any of the dies may be manufactured with two separate data transfer ports-one data transfer port for coupling to a DMA controller, and one data transfer port for coupling to a cross die bridge. In such embodiments, one of the data transfer ports of a given test controller may be placed in an inactive state based on whether the die on which it is disposed is configured to behave as a primary die (in which case only the DMA controller port of the test controller may be activated) or as a secondary die (in which case only the cross die bridge port of the test controller may be activated). For added design efficiency, both of the test controller data transfer ports may be configured to send and receive data using the same protocol when active.

Example Host System

Figure 3:
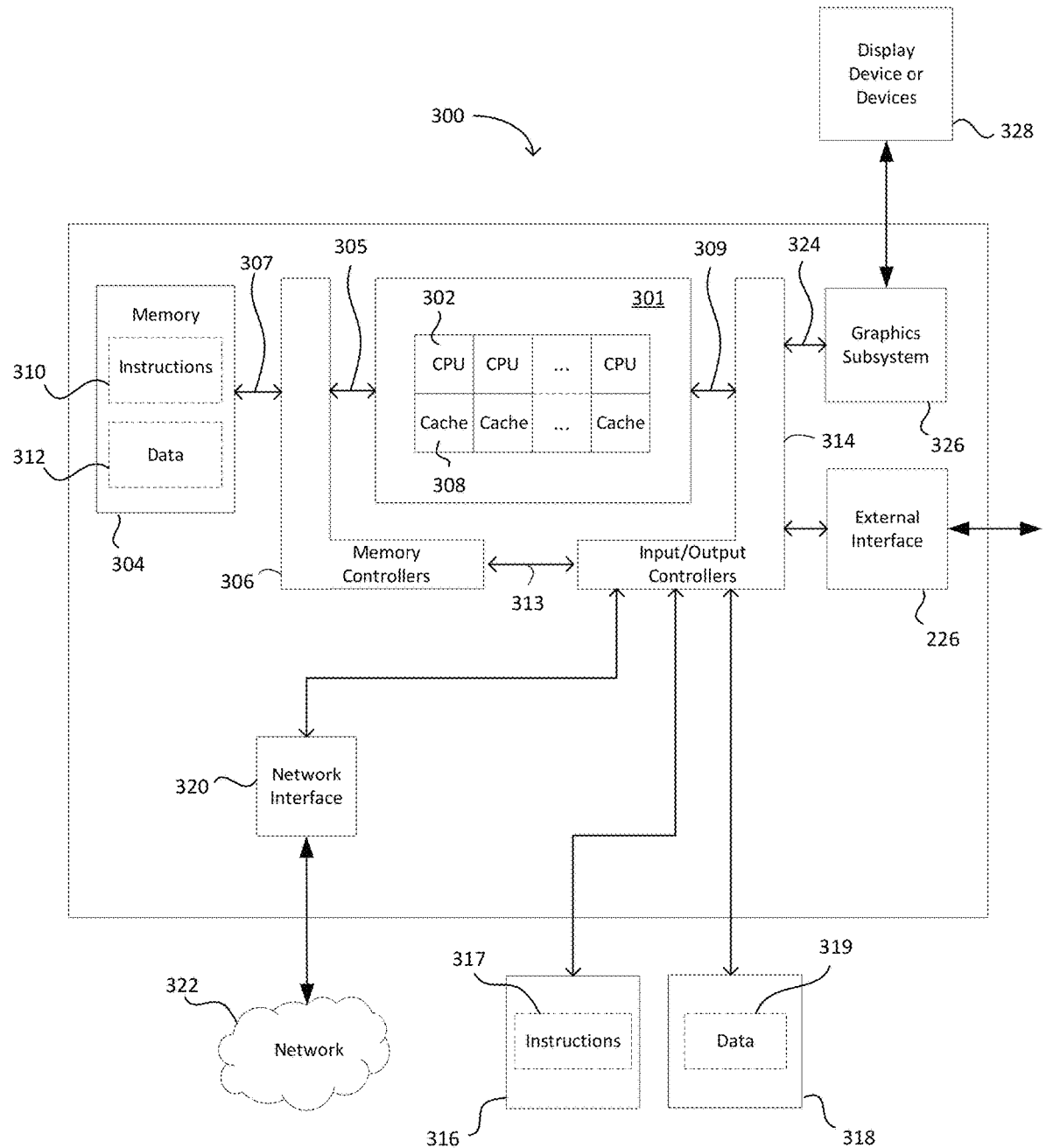
FIG. 3 is a block diagram illustrating an example computer system that may be used to implement the host system of FIG. 2 and to perform methods described herein.

FIG. 3 is a block diagram logically illustrating an example computer system 300 that may be used to implement a host system such as host system 200 and to perform any of the methods described herein. Persons having skill in the art and having reference to this disclosure will appreciate that suitable computer system architectures may vary and that alternative or additional types of computing devices may also be employed in conjunction with any of the embodiments described herein. Computer system 300 is therefore shown by way of example and not by way of limitation.

Computer system 300 includes a core/cache complex 301 that contains one or more central processor unit ("CPU") cores 302, each of which is associated with one or more levels of high-speed cache memory 308. The core/cache complex is in turn coupled to one or more high-speed memory controllers 306, as indicated at 305, and to one or more input/output controllers 314, as indicated at 309. The memory controllers and the input/output controllers may additionally be coupled to one another via one or more high-speed interconnects 313.

The memory controllers may be coupled to a system memory 304 by any suitable means, such as via a high-speed memory bus 307. The memory controllers facilitate interactions between the system memory and the core/cache complex as well as between the system memory and the input/output controllers. System memory 304 typically comprises a large array of random-access memory locations, often housed in multiple dynamic random-access memory ("DRAM") devices, which in turn may be housed in one or more dual inline memory module ("DIMM") packages, as shown. Each core 302 can execute computer-readable instructions 310 stored in the system memory, and can thereby perform operations on data 312, also stored in the system memory.

The input/output controllers may be coupled to respective subsystems as indicated generally in the drawing. Non-limiting examples of such subsystems include a graphics subsystem 326, a network interface 320, one or more non-transitory computer-readable media such as computer-readable medium 316 and computer-readable medium 318, and external data transfer interface 226.

In some embodiments, external data transfer interface 226 may take the form of a PCIe interface.

Network interface 320 may facilitate interactions between components of the computer system and an external network 322. Non-limiting examples of network 322 include a local area network, a wide area network, the internet, or any combination of these.

Non-limiting examples of non-transitory computer-readable media include so-called solid-state disks ("SSDs"), spinning-media magnetic disks, optical disks, flash drives, magnetic tape, and the like. The storage media may be permanently attached to the computer system or may be removable and portable. In the example shown, medium 316 has instructions 317 (software) stored therein, while medium 318 has data 319 stored therein. Operating system software executing on the computer system may be employed to enable a variety of functions, including transfer of instructions 310, 317 and data 312, 319 back and forth between the storage media and the system memory.

In embodiments that include a graphics subsystem, one or more of the input/output controllers may be coupled to the graphics subsystem by any suitable means, such as by a high-speed bus 324. The graphics subsystem may in turn be coupled to one or more display devices 328. While display devices 328 may be located in physical proximity to the rest of the components of the computer system, they may also be remotely located. Software running on the computer system may generate instructions or data that cause graphics subsystem to display any of the example user interface elements described above on display devices 328. Such software may also generate instructions or data that cause the display of such elements on one or more remotely located display devices (for example, display devices attached to a remotely located computer system) by sending the instructions or data over network 322 using an appropriate network protocol. The graphics subsystem may comprise one or more graphics processing units ("GPUs") to accelerate the execution of instructions or to implement any of the methods described above.

Computer system 300 may represent a single, stand-alone computer workstation that is coupled to input/output devices such as a keyboard, pointing device and display. It may also represent one of the nodes in a larger, multi-node or multi-computer system such as a cluster, in which case access to its computing capabilities may be provided by software that interacts with and/or controls the cluster. Nodes in such a cluster may be co-located in a single data center or may be distributed across multiple locations or data centers in distinct geographic regions. Furthermore, computer system 300 may represent an access point from which such a cluster or multi-computer system may be accessed and/or controlled. Any of these or their components or variants may be referred to herein as "computing apparatus," a "computing device," or a "computer system."

Example Primary Die Test Data Transfer Transactions

Figure 4:
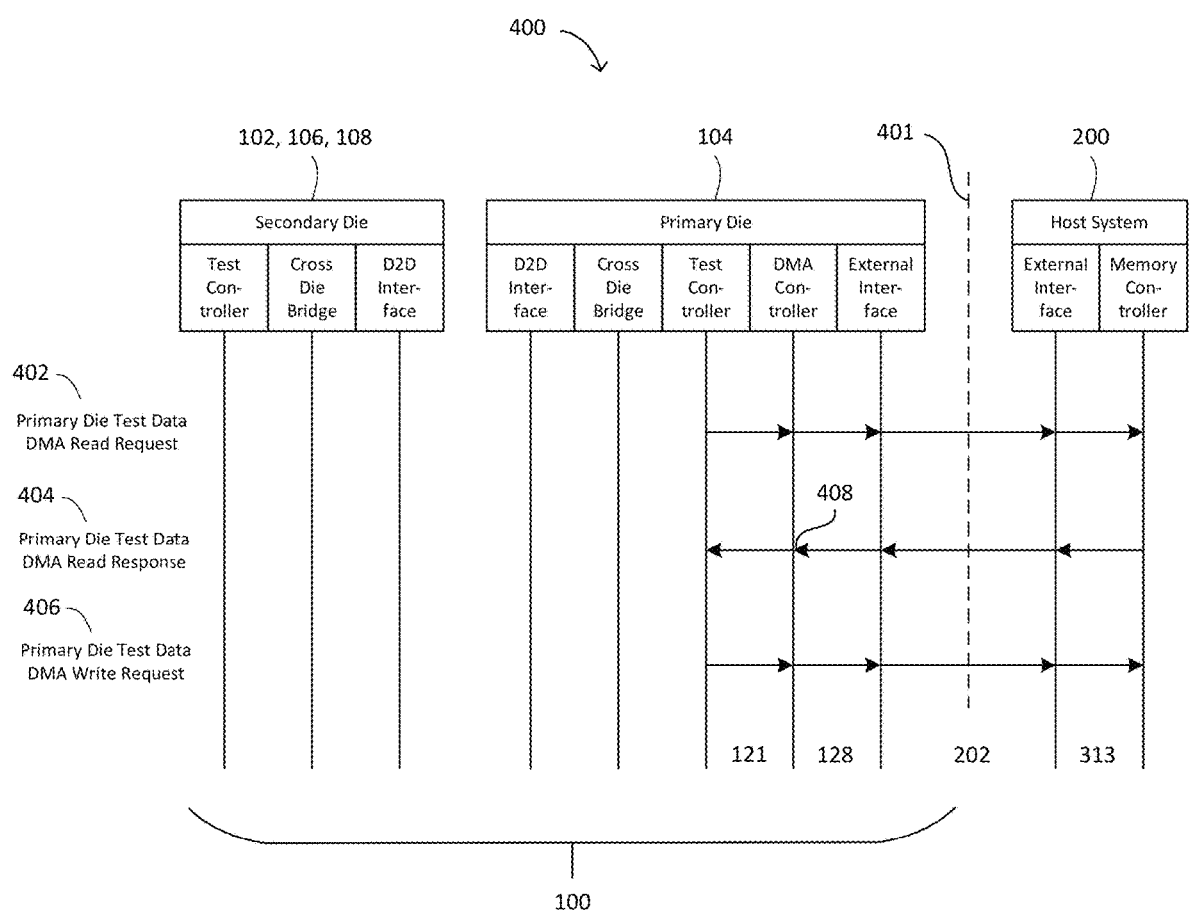
FIG. 4 is a data transfer diagram illustrating several example primary die test data transfer transactions in accordance with embodiments.

FIG. 4 is a data transfer diagram illustrating several example primary die test data transfer transactions 400 in accordance with embodiments. In the drawing, entities to the left of package boundary 401 are located inside of package 100, while entities to the right of package boundary 401 are located outside of package 100.

In particular, FIG. 4 illustrates example test data transfer transactions in an embodiment wherein the primary die contains a test controller and one or more functional units to which test patterns are applied to test the behaviors of the respective functional units. In such embodiments, the test controller in the primary die may first initiate a primary die test data DMA read request transaction 402. At the start of the transaction, the test controller may issue a test data read request to the primary die DMA controller via port 121, such as in the form of one or more data packets. Such a read request may include, for example, a start address in memory 204 from which a test pattern is to be retrieved, along with a size of the data that is to be retrieved beginning at the start address. Responsive to the test data read request, the DMA controller may implement the request by issuing one or more DMA read requests to the host system via an external data transfer path that includes port 128 and bus 202. The external data transfer path crosses package boundary 401 such that packets traveling along the external data transfer path exit package 100 and enter host system 200. Within the host system, the one or more DMA read requests may be forwarded to the host system memory controller, such as via interconnect 313, for execution.

The host system memory controller may then initiate a primary die test data DMA read response transaction 404 by sending the test data associated with read request 402 back to package 100 in one or more response data packets. The test data read response packet or packets may follow the same path as did those of the read request, but in the opposite direction, as shown. When such a response packet reaches the DMA controller in the primary die, the DMA controller makes a determination (see 408 in the diagram) as to whether to forward the packet via port 121 to a test controller disposed on the primary die, or instead to forward the packet to the cross die bridge of the primary die for relay to another die in the package. It may do so, for example, by reading a destination identifier or address in a destination field contained in a header of the response packet.

After the test controller completes a test of a functional unit using the test pattern retrieved by the read request and the read response, or when test results are otherwise ready to be sent to the host system, the test controller may initiate a primary die test data DMA write request transaction 406 to store results of the test at another location within the memory of the host system. To do so, it may issue a test data write request to the DMA controller on the primary die via port 121, also in the form of one or more data packets. Such a test data write request may include, for example, a start address in memory 204 at which the test result data should be written, along with a size of the test data that should be written beginning at the start address. Responsive to the test data write request, the DMA controller may implement the write request by issuing one or more DMA write requests in one or more response data packets sent to the host system via port 128 and bus 202. Within the host system, the one or more DMA write requests may be forwarded to the memory controller, such as via interconnect 313, for execution.

Example Secondary Die Test Data Transfer Transactions

Figure 5:
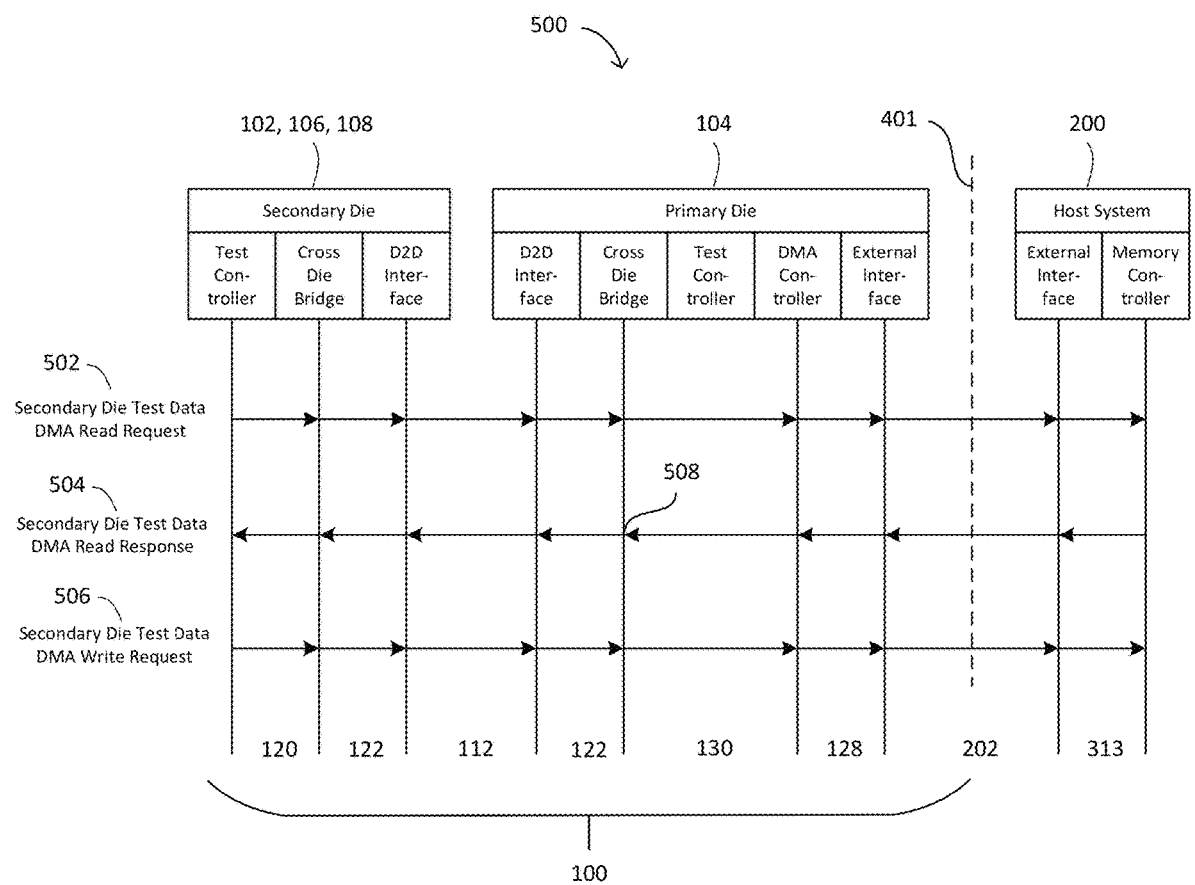
FIG. 5 is a data transfer diagram illustrating several example secondary die test data transfer transactions in accordance with embodiments.

FIG. 5 is a data transfer diagram illustrating several example secondary die test data transfer transactions 500 in accordance with embodiments. In the drawing, entities to the left of package boundary 401 are located inside of package 100, while entities to the right of package boundary 401 are located outside of package 100.

A test controller on any of the secondary dies in package 100 (e.g., any of dies 102, 106, or 108) may initiate and/or participate in such transactions during the course of performing a test of one or more functional units on the respective secondary die. To initiate such a test, a test controller on a secondary die may first initiate a secondary die test data DMA read request transaction 502. At the start of the transaction, the test controller may generate a test data read request packet and forward the same to the cross die bridge on the respective secondary die via port 120. The cross die bridge on the secondary die then forwards the packet to the die-to-die interface on the secondary die via port 122. The die-to-die interface on the secondary die forwards the packet to the die-to-die interface on the primary die via die-to-die link 112. The die-to-die interface on the primary die forwards the packet to the cross die bridge on the primary die via port 122. The cross die bridge on the primary die forwards the packet to the DMA controller on the primary die via port 130. Thereafter, the packet is forwarded to the memory controller of the host system, across package boundary 401, via the external data transfer path that includes port 128 and bus 202. Once inside the host system, the request is forwarded to the host system memory controller, such as via interconnect 313, for execution in a manner similar to that of the test data read and write transactions 402, 406 described above.

The memory controller within the host system may then initiate a secondary die test data DMA read response transaction 504 by sending the test data associated with read request 502 back to package 100 in one or more data packets. The packet or packets corresponding to the test data read response may follow the same path as did the secondary die read request packets, but in the opposite direction, as shown. When a test data read response packet reaches the cross die bridge of the primary die (see 508 in the diagram), the cross-die bridge on the primary die reads a destination identifier or address contained in a header of the packet to determine which of the several secondary dies the packet should be forwarded. The cross die bridge on the primary die may use the contents of the destination address field of the test data read response packet header to determine over which of the die-to-die interfaces on the primary die the response packet should be sent.

After the test controller on the secondary die completes a test of a functional unit using the test pattern retrieved by the read request and the read response, or when test results are otherwise ready to be sent to the host system, the test controller may initiate a secondary die test data DMA write request transaction 506 to store results of the test at another location within the memory of the host system. To do so, it may generate one or more test data write request packets and forward the same to the host system in a similar manner and over the same path as was used during the secondary die test data DMA read request transaction 502 described above.

Configuration of Test Data Addresses and Test Result Addresses

In any embodiments, the locations within memory 204 where test data 206 and test results 208 are to be stored may be configured. By way of example, in some embodiments, control registers may be provided in package 100 such that each control register is associated with a respective one of the test controllers in the package. In such embodiments, software running on the host system may write the test data and test result address information into the respective control registers at the time of package power-on. Other variations may also be employed.

Example Built-In Self Test Data Transfer Transaction

Figure 6:
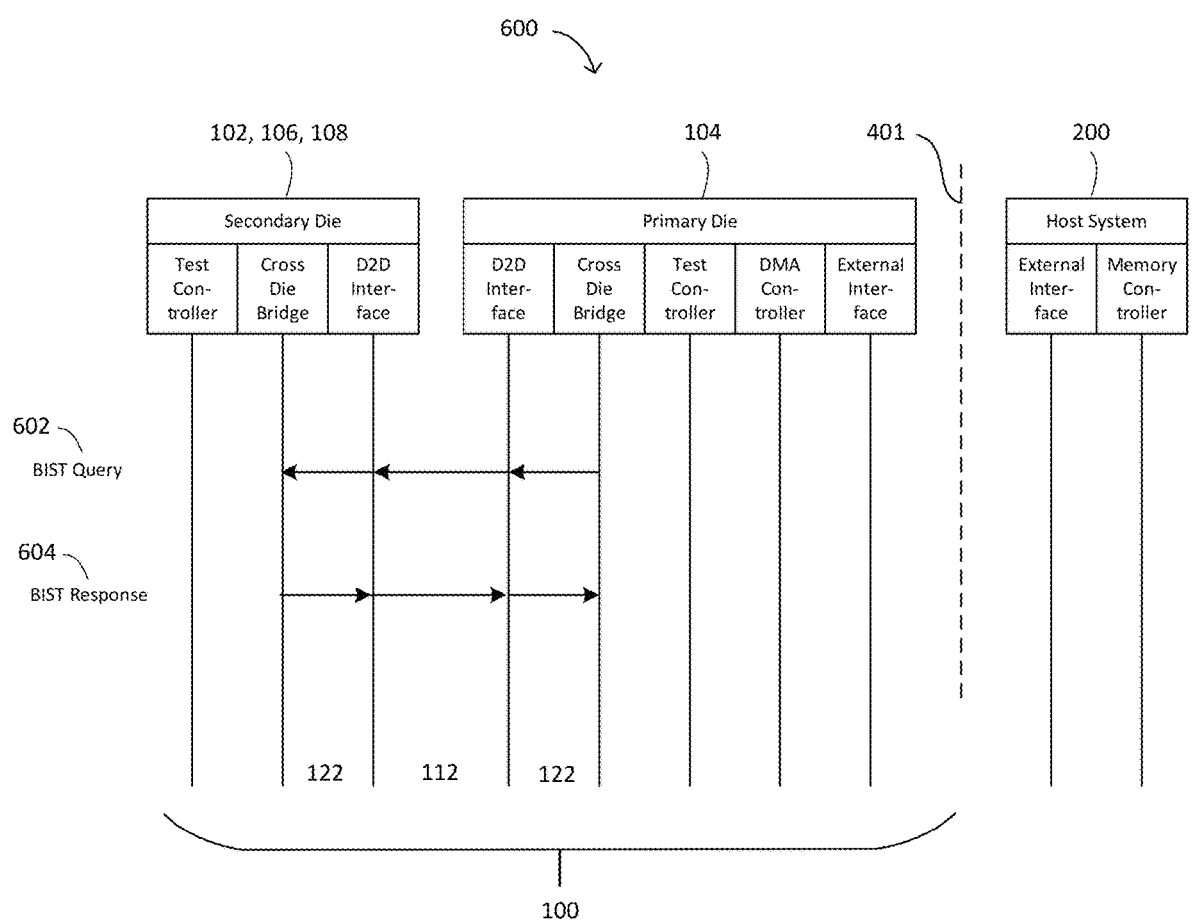
FIG. 6 is a data transfer diagram illustrating several example built-in self test ("BIST") data transfer transactions in accordance with embodiments.

FIG. 6 is a data transfer diagram illustrating example built-in self test ("BIST") transactions 600 that may be implemented in some embodiments to test the die-to-die links in package 100. Such BIST transactions may be initiated, for example, prior to performing one or more of the tests described above and/or upon power-up of the package. In some embodiments, the BIST transactions may be initiated by a component on the primary die-such as by a test controller on the primary die in embodiments wherein the primary die includes a test controller. In other embodiments, the BIST transactions may be initiated by other means. In the drawing, entities to the left of package boundary 401 are located inside of package 100, while entities to the right of package boundary 401 are located outside of package 100.

When BIST is initiated, the cross die bridges on each die may be placed in a BIST mode, in which data packets are not forwarded by the cross die bridges to test controllers on the respective dies. To test the die-to-die link between the primary die and a given one of the secondary dies, the primary die may initiate a BIST query transaction 602. In the query transaction, the cross die bridge of the primary die may generate a test packet and forward the packet to the cross die bridge on the given secondary die using the corresponding pair of die-to-die interfaces 122 and the die-to-die link 112 that extends between them, as shown. Responsive to receiving the BIST query packet, the cross die bridge on the secondary die may initiate a BIST response transaction 604. In the response transaction, the secondary die cross die bridge may generate a response packet (for example, a packet containing data extracted from the query packet or data derived therefrom) and may send the response packet back to the cross die bridge of the primary die over the same die-to-die link from which the query packet was received. Upon receiving the response packet, the cross die bridge on the primary die may examine the contents of the packet to determine whether the test was successful. In some embodiments, in the event of a BIST failure, the primary die cross die bridge or a test controller on the primary die may flag the failure according to any suitable means, such as by initiating a primary die test data DMA write request transaction 406 to write a test failure indicator to a location within the memory of the host system.

Data Packets, Headers, and Encapsulation in Various Embodiments

Persons having skill in the art and having reference to this disclosure will appreciate that the structure, size, and content of data packets used in the above described transactions, and at different stages of a single transaction, may vary from one embodiment to another.

By way of example, in some embodiments, a test controller may generate a single test data read request packet whose contents specify a starting address and a size for the test data to be retrieved from the host memory, while the DMA controller on the primary die may generate and send multiple smaller DMA read request packets to the host system to fulfill the read request. In the latter embodiments, the DMA controller may aggregate responses from the multiple DMA read requests and may send a single read response to the requesting test controller. In other embodiments, the test controller itself may divide a single large read request into multiple single read requests, while the DMA controller on the primary die may generate corresponding single DMA read requests for each such packet, and may send corresponding individual DMA read responses back to the test controller for each read request packet that was generated by the test controller. In further embodiments, the DMA controller may aggregate read or write requests from a test controller and issue a single larger read or write request to the host system to increase performance and bus utilization. Other analogous variations are also possible.

Moreover, the header content and/or the number of header layers in any packet may vary at different stages of a single transaction. For example, the header content in a packet passing between a test controller and a cross die bridge (in the case of a secondary die), or between a test controller and the DMA controller (in the case of a primary die) may correspond to a test controller protocol. A die-to-die interface may then encapsulate that packet within a die-to-die protocol header layer for transmission over a die-to-die link to another die. The die-to-die protocol header layer may then be removed by the die-to-die interface on the receiving die. Similarly, an external data transfer interface (e.g., interface 126 on the primary die) may encapsulate a DMA controller packet within an external data transfer protocol header (e.g., within a PCIe protocol header) for transmission over external link 202, and the external data transfer protocol header may then be removed by the external data transfer interface on the receiving side of the link (e.g., by interface 226). Other analogous variations are also possible.

Protocol encapsulation and un-encapsulation steps may also be performed internally within each die as appropriate while packets are being moved between components therein. Moreover, in any embodiments, a transmission control protocol header may be added to packets associated with connection-oriented transactions to keep track of the sequence of the packets in the transaction and to verify that all expected packets were successfully transmitted and received during the transaction.

CONCLUSION

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

What is claimed is:

1. An integrated circuit package, comprising:
a package substrate;
an array of conductive elements that are accessible from outside the integrated circuit package; and
two or more discrete semiconductor dies coupled to the package substrate; wherein:
the two or more discrete semiconductor dies comprise a primary die and at least one secondary die;
the primary die comprises an external data transfer interface, a direct memory access ("DMA") controller, a primary cross-die bridge, and at least one primary die-to-die interface, wherein the external data transfer interface is coupled to one or more of the conductive elements such that the external data transfer interface is electrically accessible from outside the package;
each of the at least one secondary dies comprises a secondary test controller, a secondary cross-die bridge, and a secondary die-to-die interface;
at the primary die, the DMA controller has a first DMA controller port coupled to the external data transfer interface and a second DMA controller port coupled to the primary cross-die bridge;
at each of the secondary dies, the secondary cross-die bridge has a first bridge port coupled to the secondary die-to-die interface and a second bridge port coupled to the secondary test controller; and
the primary cross die bridge is operable to route a first test data packet received from the DMA controller to the secondary die via one of the at least one primary die-to-die interfaces.

2. The integrated circuit package of claim 1, wherein:
the two or more discrete semiconductor dies further comprise at least two secondary dies;
the primary die-to-die interfaces comprise at least two primary die-to-die interfaces, each of which is associated with a respective one of the at least two secondary dies; and
the primary cross die bridge is operable to route the first test data packet received from the DMA controller to a receiving one of the secondary dies, via the primary die-to-die interface that is associated with the receiving secondary die, based on contents of a destination field in a header of the first test data packet.

3. The integrated circuit package of claim 2, wherein:
the primary cross-die bridge comprises a separate primary bridge port for each of the primary die-to-die interfaces.

4. The integrated circuit package of claim 1, wherein:
the second test controller is configured to access second test patterns from one or more second test data locations outside the package and to store second test results to one or more second test result locations outside the package via DMA transfers along a second test data transfer path that includes the secondary cross-die bridge, the secondary die-to-die interface, the primary die-to-die interface, the primary cross-die bridge, the DMA controller, and the external data transfer interface.

5. The integrated circuit package of claim 4, wherein:
the primary die further comprises a primary test controller; and
the DMA controller has a third DMA controller port coupled to the primary test controller.

6. The integrated circuit package of claim 5, wherein:
the DMA controller is configured to route a second data packet received from the external data transfer interface either to the primary test controller or to the cross die bridge based on contents of a destination field in a header of the first test data packet.

7. The integrated circuit package of claim 5, wherein:
the primary test controller is configured to access first test patterns from one or more first test data locations outside the package and to store first test results to one or more first test result locations outside the package via DMA transfers along a first test data transfer path that includes the DMA controller and the external data transfer interface.

8. The integrated circuit package of claim 5, wherein:
the second DMA controller port and the third DMA controller port are both configured to operate according to a first communications protocol.

9. The integrated circuit package of claim 8, wherein:
the first DMA controller port is configured to operate according to a second communications protocol distinct from the first communications protocol.

10. The integrated circuit package of claim 9, wherein:
each of the die-to-die interfaces is configured to operate according to a die-to-die communications protocol distinct from the first protocol and the second communications protocol.

11. The integrated circuit package of claim 1, wherein:
at least one of the secondary dies comprises a secondary external data transfer interface and a secondary DMA controller; and
the secondary external data transfer interface and the secondary DMA controller are configured to be active or inactive responsive to one or more configuration bits on the at least one secondary die.

12. The integrated circuit package of claim 1, wherein:
the external data transfer interface comprises a peripheral component interconnect express ("PCIe") link.

13. The integrated circuit package of claim 1, wherein:
each of the cross-die bridges is configured to operate as the primary cross-die bridge or as the secondary cross-die bridge responsive to one or more configuration bits associated with the die that contains the respective cross-die bridge.

14. The integrated circuit package of claim 13, wherein:
when a given one of the cross-die bridges is configured to operate as the primary cross-die bridge, it operates as a test data transfer link between a die-to-die interface and a DMA controller on the die that contains the given cross-die bridge; and
when the given cross-die bridge is configured to operate as one of the secondary cross-die bridges, it operates as a test data transfer link between a die-to-die interface and a test controller associated with the die that contains the given cross-die bridge.

15. The integrated circuit package of claim 1:
further comprising circuitry in the primary die and in the secondary die configured to execute a built in self test that comprises verifying, responsive to a self test activation command, a self test data transfer path that includes the primary cross-die bridge, the primary die-to-die interface, the secondary die-to-die interface, and the secondary cross-die bridge.

16. The integrated circuit package of claim 15, wherein:
the primary cross-die bridge is configured to, responsive to receiving the self test activation command, send a first self test pattern to the secondary cross-die bridge via the self test data transfer path and to receive a second self test pattern from the secondary cross-die bridge via the self test data transfer path.

17. The integrated circuit package of claim 15, wherein:
the primary test controller is configured to issue the self test data transfer command to the primary cross-die bridge to initiate the built in self test.

18. The integrated circuit package of claim 1, wherein:
the die-to-die interfaces are not directly accessible from outside the package.

19. A method for testing an integrated circuit ("IC") package, comprising:
sending a test data read request from a secondary test controller located on a secondary die inside the IC package to a host system located outside the IC package;
wherein the test data read request traverses a test data path that includes a secondary die path on the secondary die, a primary die path on a primary die located inside the IC package, and an external path that extends outside the integrated circuit package;
receiving, at the secondary test controller, a test data read response from the host system, wherein the test data read response traverses the test data path in a direction opposite to that of the test data read request; and
causing a test to be performed on circuitry within the secondary die responsive to contents in the test data read response.

20. The method of claim 19, further comprising:
including at least one result of the test in a test result write request; and
sending the test result write request from the secondary test controller to the host system via the test data path.

21. The method of claim 20, further comprising:
in circuitry of the primary die, determining to which of two or more secondary dies the test data read response should be forwarded;
wherein each of the two or more secondary dies is located inside the IC package.

22. The method of claim 19, wherein the test data path extends:
from the secondary test controller to a secondary cross-die bridge on the secondary die;
from the secondary cross-die bridge to a primary cross-die bridge on the primary die via a die-to-die transfer link;
from the primary cross-die bridge to a direct memory access ("DMA") controller on the primary die; and
from the DMA controller to the host system via an external transfer link.

23. The method of claim 22, wherein:
the external transfer link comprises a peripheral component interconnect express ("PCIe") link.

24. The method of claim 22, further comprising:
inside the IC package, performing a self test of the die-to-die link.

25. The method of claim 24, wherein the self test comprises:
sending a self test pattern from the primary cross-die bridge to the secondary cross-die bridge via the die-to-die link;
sending a self test response from the secondary cross-die bridge to the primary cross-die bridge via the die-to-die link; and
making a self test pass/fail determination based on contents of the self test response.

* * * * *